May 25, 1965

E. C. RUTTY 3,184,997

SEALING TOOL

Filed Sept. 16, 1963

INVENTOR.
EDWARD C. RUTTY

BY Lindsey, Prutzman and Hayes
ATTORNEYS

May 25, 1965  E. C. RUTTY  3,184,997
SEALING TOOL

Filed Sept. 16, 1963  2 Sheets-Sheet 2

INVENTOR.
EDWARD C. RUTTY

BY Lindsey, Brutzman and Hayes
ATTORNEYS 3,184,997
SEALING TOOL
Edward C. Rutty, Portland, Conn., assignor to The Stanley Works, New Britain, Conn., a corporation of Connecticut
Filed Sept. 16, 1963, Ser. No. 308,941
2 Claims. (Cl. 81—9.1)

The present invention relates to tools for sealing strapping and the like, and more particularly to a new and improved sealing device wherein the seal is effected by the cooperative action of jaw and anvil members.

It is an object of the present invention to provide a tool for sealing strapping and the like which can accommodate a variety of strap gauges and seal thicknesses while always effecting the correct sealing action for each gauge and thickness utilized.

Another object is to provide a tool which accommodates a variety of sealing materials while saving the time required to perform the sealing operation as well as the expense of maintaining different tools for each variety of sealing material.

Still another object of the present invention is to provide a tool at low cost which is of sturdy construction and can be adjusted to accommodate various seals with a minimum of time delay and without the need of special tools or skills.

Other objects will be in part obvious and in part pointed out more in detail hereinafter.

As will be apparent to persons skilled in the art, various modifications and adaptations of the structure above described will become readily apparent without departure from the spirit and scope of the invention, the scope of which is defined in the appended claims.

Figure 1:
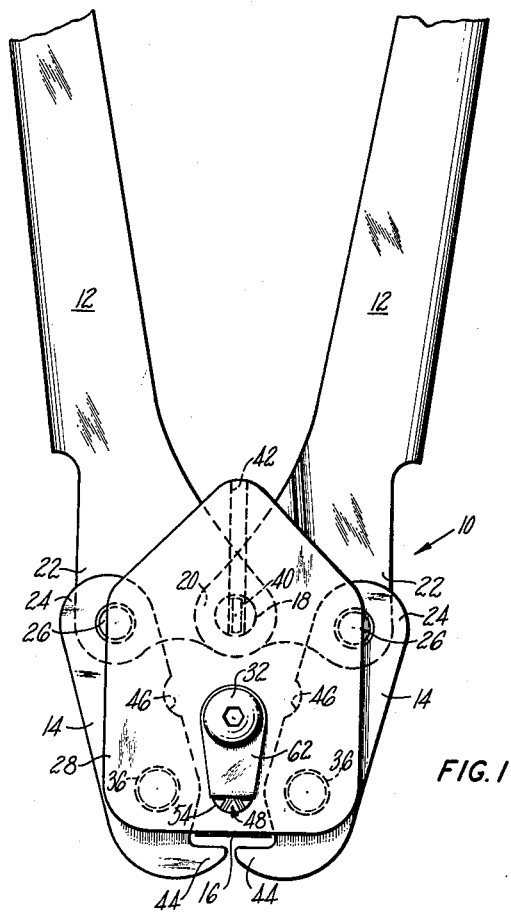
FIG. 1 shows a sectional plan view of a tool embodying the present invention.
Figure 2:
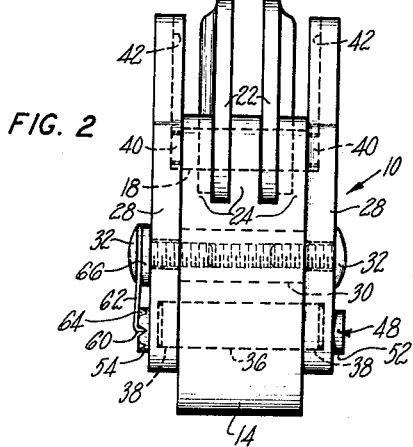
FIG. 2 shows a side view of the tool shown in FIG. 1.

Referring now to the invention in greater detail, there is generally shown in FIG. 1 a sealing tool 10 for sealing strapping and the like. For convenience and brevity of description the tool will be described specifically in connection with a tool intended for hand operation in the sealing of steel strapping, although it may be produced in other forms for use in connection with other materials. Hand sealing tool 10 generally comprises a pair of handles 12 adapted to actuate a pair of jaw members 14 which cooperate with an adjustable barrier or anvil 16 to effect a seal on strapping or the like after it has circumscribed the material to be bound. Elongated handles 12 are interconnected by a toggle pin 18 which extends through apertures in the intermeshing portions 20 of each handle 12 and are pivotally joined to jaw members 14 through respective interfitting portions 22 of handles 12 and 24 of jaw members 14, as best shown in FIG. 2, by means of link pins 26. Jaw members 14 are bounded on two sides by a pair of face plates 28 which are generally flat and spaced parallel to each other on opposite sides of tool 10, as shown in FIG. 2. Located above anvil 16 and between jaw members 14 is the assembly spacer 30 which, as shown in FIG. 2, abuts both face plates 28 and, with the aid of button-head holding screws 32, maintains the plates in a fixed parallel relationship. Holding screws 32 extend through face plates 28 and are threadably received by bore 34 of assembly spacer 30, shown in FIG. 4. One of the holding screws 32 additionally holds a spring detent lock, as will be described more fully hereinafter, for securing the adjustable anvil 16 in a fixed position.

Jaw members 14 are mounted on fixed jaw pins 36 which extend into recesses 38 of face plates 28, as shown in FIG. 2. Thus, the face plates 28, which are held in a fixed parallel relationship by spacer 30 and holding screws 32, will support jaw members 14 through jaw pins 36 and maintain a fixed pivot point at the position of pins 36 in the assembly, while at the same time being prevented from rotational movement relative to each other.

Figure 3:
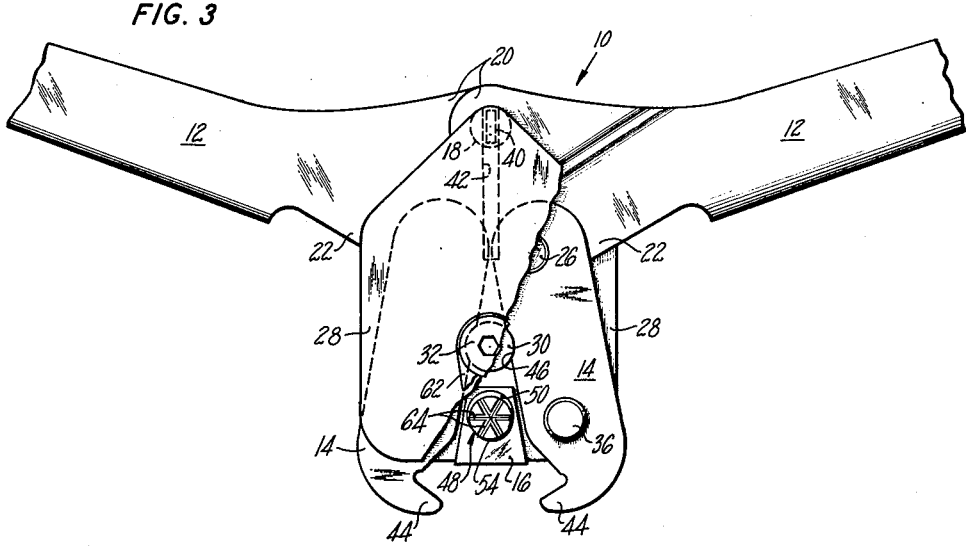
FIG. 3 shows a view of the head portion of the tool of FIG. 1 with the jaws open and the face plate partially broken away.

In the operation of tool 10, as handles 12 are moved apart, beveled reduced end portions 40 of toggle pin 18 travel along grooves 42 in face plates 28 from the position shown in FIG. 1 to that shown in FIG. 3. The movement of handles 12 causes jaws 14 to pivot about their respective fixed jaw pins 36 and further causes interfitting portions 24 of each jaw member 14 to approach one another resulting in an opening of the jaw teeth 44. As best shown in FIGS. 1 and 3, jaw members 14 further possess arcuate recesses 46 which accommodate assembly spacer 30 when the jaws are in an open position and additionally permit teeth 44 to open to a greater degree than would otherwise be permissible.

Figure 4:
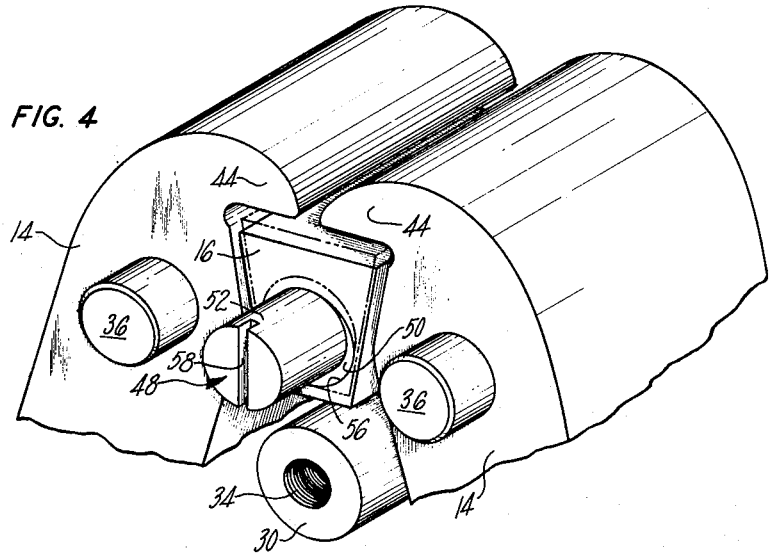
FIG. 4 is an enlarged perspective view of a portion of the head with the face plates removed.

According to the present invention, anvil 16 is movably mounted in the sealer assembly 10 so as to permit the adjustment thereof and facilitate the use of assembly 10 with strapping and sealing of various gauges. As shown in FIGS. 3 and 4, anvil 16 is mounted on a freely rotatable eccentric pin or shaft 48 having a cam or eccentric portion 50 and bearing portions 52 and 54 located on opposite ends of the cam portion. Bearing portions 52 and 54 of eccentric pin 48 extend outwardly through apertures in each face plate 28 so as to facilitate adjustment of pin 48 and consequently anvil 16, while cam portion 50, as best shown in FIG. 4, slideably contacts the surface of longitudinal bore 56 extending through anvil 16. Bearing portion 52 is shown to contain screwdriver slot 58 thus providing an easy and simple means of rotating eccentric pin 48 which in turn provides the desired adjustment of anvil 16 between the solid line position and the dotted line position shown in FIG. 4 or some intermediate position.

The adjustment is such that litle time loss is involved and no specialized skill is required. It can be readily accomplished by moving the leg 60 of spring detent 62, shown in FIG. 2, thus releasing the detent lock from one of the plurality of splineways 64 located on the end of bearing portion 54 of eccentric pin 48. The detent lock 62, which depends from holding screw 32, is shown to be spaced from face plate 28 by means of any suitable spacer, such as washer 66. The lock can be released by either moving the spring 62 outwardly until pin 48 is freely rotatable or by pivoting the spring lock 62 about holding screw 32, thus effecting the same result. As soon as the lock is released, eccentric pin 48 may be rotated simply to the desired position by means of a screwdriver, after which the spring detent 62 is moved back into a locking position. Preferably, however, the splineways are provided with tapered sides, as best shown in FIG. 2, so that the rotation of pin 48 will cause the leg 60 to cam out of the splineway 64, thus obviating the necessity of initially releasing the spring detent from the splineway. The entire adjustment operation is completed in a matter of seconds in an easy and simple manner.

As will be apparent from the foregoing description, the present invention provides a tool for sealing strapping or the like which is readily adjustable to accommodate a variety of strapping gauges or seal thicknesses without the need of special skill or appreciable delay in the manufacturing operation. Additionally, the proper sealing action is obtained from a single tool on such various thicknesses thus eliminating the need for a plurality of such tools to ensure a secure fastening of the strapping.

As will be apparent to persons skilled in the art, various modifications and adaptations of the structure above described will become readily apparent without departure from the spirit and scope of the invention, the scope of which is defined in the appended claims.

I claim:
1. A sealing device for strapping and the like comprising a pair of pivotally mounted jaws each having seal-forming surfaces; an adjustable anvil located between said jaws and spaced from said surfaces; said anvil having a longitudinal bore extending therethrough; an eccentric pin extending through said bore and having a plurality of splineways at one end thereof; and a spring detent cooperating with one of said splineways thereby locking said pin against movement and fixing the position of said anvil relative to said seal-forming surfaces.

2. A sealing device for strapping and the like comprising a pair of pivotally mounted jaws each having seal-forming surfaces; an adjustable anvil located between said jaws and spaced from said surfaces; said anvil having a longitudinal bore extending therethrough; an eccentric pin extending through said bore and having a plurality of splineways at one end thereof; and a spring detent cooperating with one of said splineways thereby locking said pin against movement and fixing the position of said anvil relative to said seal-forming surfaces, said splineways having tapered sides whereby upon rotation of the eccentric pin said spring detent will cam out of the cooperating splineway into a nonlocking position.

References Cited by the Examiner
UNITED STATES PATENTS

| | | |
|---|---|---|
| 328,288 | 10/85 | Chase. |
| 2,254,416 | 9/41 | Burns. |
| 2,432,306 | 12/47 | Gerrard et al. |

FOREIGN PATENTS

| | | |
|---|---|---|
| 651,388 | 10/28 | France. |

WILLIAM FELDMAN, *Primary Examiner.*